(12) United States Patent
Sakurai et al.

(10) Patent No.: US 10,968,370 B2
(45) Date of Patent: Apr. 6, 2021

(54) ARTICLE PROVIDED WITH ADHESIVE LAYER AND RELEASE LAYER

(71) Applicant: 3M INNOVATIVE PROPERTIES COMPANY, Saint Paul, MN (US)

(72) Inventors: Aizoh Sakurai, Tokyo (JP); Yoshiteru Kakinuma, Tokyo (JP); Bing Liu, The Quintet (SG)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/579,973

(22) PCT Filed: Jun. 3, 2016

(86) PCT No.: PCT/US2016/035653
§ 371 (c)(1),
(2) Date: Dec. 6, 2017

(87) PCT Pub. No.: WO2016/200685
PCT Pub. Date: Dec. 15, 2016

(65) Prior Publication Data
US 2018/0171183 A1 Jun. 21, 2018

(30) Foreign Application Priority Data
Jun. 12, 2015 (JP) .............................. JP2015-119665

(51) Int. Cl.
*C09J 7/40* (2018.01)
*B32B 3/30* (2006.01)
(Continued)

(52) U.S. Cl.
CPC ................. *C09J 7/403* (2018.01); *B32B 3/04* (2013.01); *B32B 3/30* (2013.01); *B32B 5/022* (2013.01);
(Continued)

(58) Field of Classification Search
CPC ........ C09J 7/403; C09J 7/10; C09J 2423/045; C09J 2423/105; C09J 2483/00;
(Continued)

(56) References Cited

U.S. PATENT DOCUMENTS

| 3,582,393 A | 6/1971 | Shikda |
| 4,397,905 A | 8/1983 | Dettmer |

(Continued)

FOREIGN PATENT DOCUMENTS

| JP | H0633022 | 2/1994 |
| JP | H11-181375 | 7/1999 |

(Continued)

OTHER PUBLICATIONS

International Search report for PCT International Application No. PCT/US2016/035653 dated Sep. 12, 2016, 4 pages.

(Continued)

*Primary Examiner* — Patricia L. Nordmeyer
(74) *Attorney, Agent, or Firm* — 3M IPC

(57) ABSTRACT

An article 10 is provided with an adhesive layer 14 that includes an adhesive, a release layer 12 that is stacked on the adhesive layer 14, and an air layer 16 that is interposed between the adhesive layer 14 and the release layer 12. On a surface 12a of the release layer 12 that opposes the adhesive layer 14, microprotrusions 20 that contact the adhesive layer 14 with tips 20a are provided. The microprotrusions 20 are provided with a wall-shaped portion 22 having a shape that at least partially surrounds the air layer 16 between the adhesive layer 14 and the release layer 12. The wall-shaped portion 22 protects a main portion 14a of the adhesive layer 14 that is adjacent to the air layer 16 from contamination. By selecting a shape, dimensions, and the like of the micro protrusions 20, a release force of the release layer 12 can be adjusted to a desired range.

7 Claims, 7 Drawing Sheets

(51) Int. Cl.
  *B32B 7/06* (2019.01)
  *B32B 7/12* (2006.01)
  *C09J 7/10* (2018.01)
  *B32B 5/02* (2006.01)
  *B32B 3/04* (2006.01)
  *B32B 27/36* (2006.01)
  *B32B 5/26* (2006.01)
  *B32B 27/12* (2006.01)
  *B32B 27/08* (2006.01)
  *B32B 27/32* (2006.01)

(52) U.S. Cl.
  CPC ............... *B32B 5/024* (2013.01); *B32B 5/26* (2013.01); *B32B 7/06* (2013.01); *B32B 7/12* (2013.01); *B32B 27/08* (2013.01); *B32B 27/12* (2013.01); *B32B 27/32* (2013.01); *B32B 27/36* (2013.01); *C09J 7/10* (2018.01); *B32B 2250/02* (2013.01); *B32B 2307/748* (2013.01); *B32B 2405/00* (2013.01); *B32B 2535/00* (2013.01); *C09J 2423/045* (2013.01); *C09J 2423/105* (2013.01); *C09J 2483/00* (2013.01); *Y10T 428/1476* (2015.01)

(58) Field of Classification Search
  CPC .... B32B 3/30; B32B 7/06; B32B 7/12; B32B 27/08; B32B 27/32
  See application file for complete search history.

(56) References Cited

U.S. PATENT DOCUMENTS

| | | | |
|---|---|---|---|
| 4,481,232 A | 11/1984 | Olson | |
| 4,781,957 A | 11/1988 | Brown | |
| 5,130,185 A | 7/1992 | Ness | |
| 5,891,077 A | 4/1999 | Gilman | |
| 5,902,260 A | 5/1999 | Gilman | |
| 6,524,675 B1 | 2/2003 | Mikami | |
| 6,569,374 B1 | 5/2003 | Poulakis | |
| 6,759,110 B1 | 7/2004 | Fleming | |
| 7,678,443 B2 | 3/2010 | Schulz | |
| 7,867,601 B2 | 1/2011 | Ikishima | |
| 8,394,478 B2 | 3/2013 | Ukei | |
| 8,486,505 B2 | 7/2013 | Ukei | |
| 8,530,021 B2 * | 9/2013 | Bartusiak | B32B 38/06 428/40.1 |
| 8,530,022 B2 * | 9/2013 | Fabo | A61F 13/023 428/41.7 |
| 8,541,481 B2 | 9/2013 | Determan | |
| 8,822,559 B2 | 9/2014 | Zoller | |
| 2003/0129343 A1 * | 7/2003 | Galkiewicz | B44C 1/17 428/40.1 |
| 2003/0178124 A1 | 9/2003 | Mikami | |
| 2003/0235677 A1 | 12/2003 | Hanschen | |
| 2003/0235678 A1 | 12/2003 | Graham | |
| 2004/0001931 A1 * | 1/2004 | Izzi | B32B 3/30 428/40.1 |
| 2005/0074573 A1 | 4/2005 | Bowen | |
| 2006/0172104 A1 | 8/2006 | Lim | |
| 2006/0188704 A1 | 8/2006 | Mikami | |
| 2006/0228509 A1 | 10/2006 | Sher | |
| 2007/0218235 A1 | 9/2007 | Wu | |
| 2008/0299347 A1 | 12/2008 | Ukei | |
| 2009/0053449 A1 | 2/2009 | Hannington | |
| 2010/0324507 A1 * | 12/2010 | Maier | A61F 13/0276 604/289 |
| 2012/0231199 A1 | 9/2012 | Bartusiak | |
| 2013/0071622 A1 | 3/2013 | Flanigan | |
| 2014/0085868 A1 | 3/2014 | Kim | |

FOREIGN PATENT DOCUMENTS

| | | |
|---|---|---|
| JP | 2000-190388 | 7/2000 |
| JP | 3101367 | 10/2000 |
| JP | 2002-219778 | 8/2002 |
| JP | 2002332460 | 11/2002 |
| JP | 2003-080638 | 3/2003 |
| JP | 2003-342533 | 3/2003 |
| JP | 2003-235890 | 8/2003 |
| JP | 2009-142328 | 7/2009 |
| JP | 2009-202442 | 9/2009 |
| JP | 2012-061171 | 3/2012 |
| WO | WO 94/23610 | 10/1994 |
| WO | WO 01/32044 | 5/2001 |
| WO | WO 02/14447 | 2/2002 |
| WO | WO 2003/060031 | 7/2003 |
| WO | WO 2004/000963 | 12/2003 |
| WO | WO 2008/042650 | 4/2008 |
| WO | WO 2009/069445 | 6/2009 |
| WO | WO 2010/056544 | 5/2010 |
| WO | WO 2010/056546 | 5/2010 |
| WO | WO 2012/121869 | 9/2012 |
| WO | WO 2014/197194 | 12/2014 |
| WO | WO 2016/200876 | 12/2016 |

OTHER PUBLICATIONS

Supplementary European Search Report for EP 16 80 8061 dated Oct. 22, 2018.
Supplementary European Search Report for EP 16 80 8153 dated Dec. 6, 2018.

* cited by examiner

ARTICLE PROVIDED WITH ADHESIVE LAYER AND RELEASE LAYER

CROSS REFERENCE TO RELATED APPLICATIONS

This application is a national stage filing under 35 U.S.C. 371 of PCT/US2016/035653, filed Jun. 3, 2016, which claims the benefit of Japanese Application No. 2015-119665, filed Jun. 12, 2015, the disclosures of which are incorporated by reference in their entirety herein.

FIELD

The present invention relates to an article provided with an adhesive layer and a release layer.

BACKGROUND

An article provided with an adhesive layer that includes an adhesive and a release layer that is releasably stacked on the adhesive layer is known as an adhesive tape product or the like. For example, JP 2003-342533A (Claims, par. 0012, par. 0014, par. 0015) discloses an adhesive sheet that has a substrate sheet, an adhesive layer, and a release sheet in that order. The following descriptions are in JP 2003-342533A: "An adhesive sheet of the present invention is made by, for example, stacking an adhesive layer on an uneven release surface of a release sheet that has an uneven release surface. The release sheet having the uneven surface can be manufactured by, for example, providing a release-treated layer by coating a release agent such as a silicone resin as necessary on a release sheet substrate and applying thereto a desired uneven shape processing by a known method such as embossing processing"; "By stacking the adhesive layer on the release sheet that has the above uneven shape, this uneven shape is transferred to an adhesive layer surface, and concave portions and convex portions thereof respectively form convex portions and concave portions corresponding to these shapes in the adhesive layer"; "After peeling the above release sheet, the adhesive layer is abutted to an adherend, and by affixing by applying pressure by a squeegee or a finger, the convex portions of an uneven portion formed in the adhesive layer surface by being transferred from the release sheet bonds to the adherend while maintaining the contact area ratio of 30 to 90% described above; at this time, because the concave portions become airflow channels, air escapes, and swelling due to air accumulation does not arise, affixing can be performed with favorable adhesion, easily, and cleanly."

WO 2009/069445 (Claims, par. 0007) discloses a release sheet provided with a substrate, an undercoat layer formed on the substrate, and a release agent layer formed on the undercoat layer. The following descriptions are in WO 2009/069445: "As illustrated in FIG. 2, an adhesive body 20 is configured by affixing an adhesive sheet 23, which is formed by stacking an adhesive layer 22 on one surface of an adhesive sheet substrate 21, to a release sheet 10 so the adhesive layer 22 adheres to a surface 13A of a release agent layer 13"; "The release agent layer 13 has unevenness formed on the surface 13A thereof, and by this, a release force of when releasing the release sheet 10 can be set to an appropriate value"; "As an adhesive that forms the adhesive layer 22, a non-silicone adhesive can be used without any limitations in particular; for example, an acrylic adhesive or the like is used. In the present embodiment, the release agent layer 13 and the undercoat layer 12 are formed by a polyolefin resin; moreover, by the adhesive layer 22 being formed by the non-silicone resin, the release sheet 10 and the adhesive body 20 can be made to substantially not include silicone compounds." Moreover, JP 2003-080638A discloses a release liner provided with a release liner substrate and a silicone release layer formed on the release liner substrate.

SUMMARY

In the article made by stacking the release layer on the adhesive layer that includes the adhesive, being able to adjust to a desired range a force required to release the release layer from the adhesive layer (referred to as "release force" in the present application), being able to suppress temporal change of the release force, the release layer being able to protect the adhesive layer from contamination, being able to be manufactured inexpensively, being able to prevent migration of the release layer to the adhesive layer, and the like are desired.

One aspect of the present invention is an article, equipped with: an adhesive layer that includes an adhesive; a release layer that is stacked on the adhesive layer; and an air layer that is interposed between the adhesive layer and the release layer; wherein on a surface of the release layer that opposes the adhesive layer, microprotrusions that contact the adhesive layer with tips are provided, and the microprotrusions are provided with a wall-shaped portion that has a shape that at least partially surrounds the air layer between the adhesive layer and the release layer and protects a main portion of the adhesive layer that is adjacent to the air layer from contamination.

The article according to the one aspect can have a configuration where no release agent is present between the microprotrusions and the adhesive layer.

The article according to the one aspect of the present invention can adjust the release force of the release layer to an appropriate desired range according to an application of the article by selecting a shape, dimensions, and the like of the microprotrusions provided by the release layer (and, therefore, selecting a contact area of the tips of the microprotrusions on the adhesive layer). For example, as the release layer, because a generic material such as an olefin can be used without using a comparatively expensive material such as a fluorine release agent, which is generally used with a silicone adhesive, the article can be manufactured comparatively inexpensively regardless of an adhesive layer being provided that includes a silicone adhesive. Furthermore, the article can protect the main portion of the adhesive layer that is adjacent to the air layer from contamination by the wall-shaped portion had by the microprotrusions.

Furthermore, by the article having the configuration where no release agent is present between the tips of the microprotrusions and the adhesive layer, a temporal change of the release force due to the release agent migrating over time to the adhesive layer can be avoided, and after releasing the release layer as well, reduction of an adhesive force of the adhesive layer due to the migration of the release agent can be prevented.

DETAILED DESCRIPTION

Figure 1A:
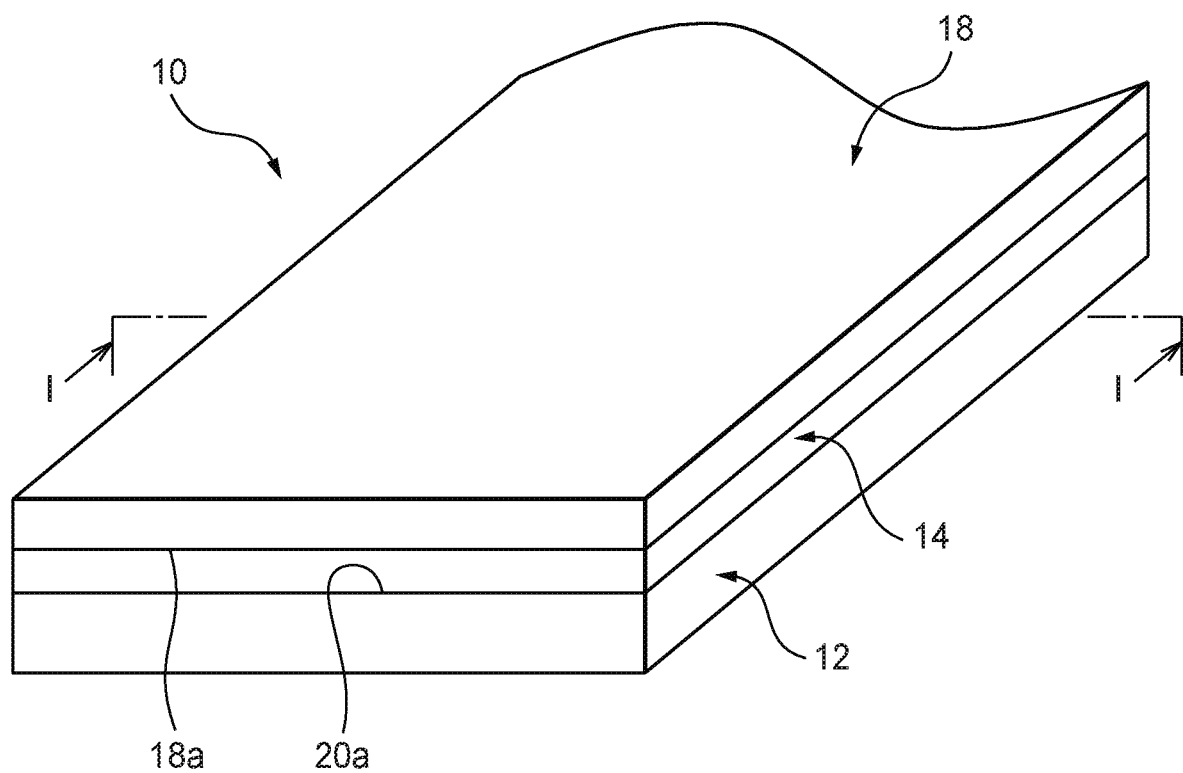
FIG. 1A is a perspective view illustrating an article according to one embodiment.
Figure 1B:
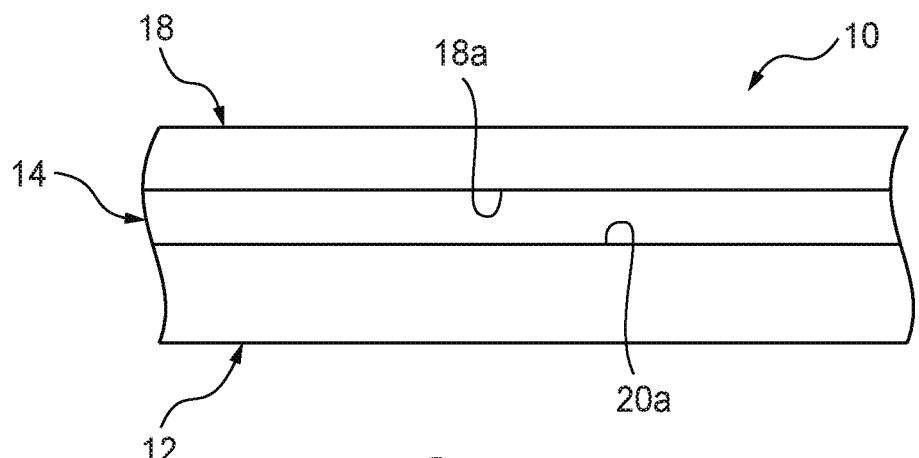
FIG. 1B is a front view of the article in FIG. 1A.
Figure 1C:
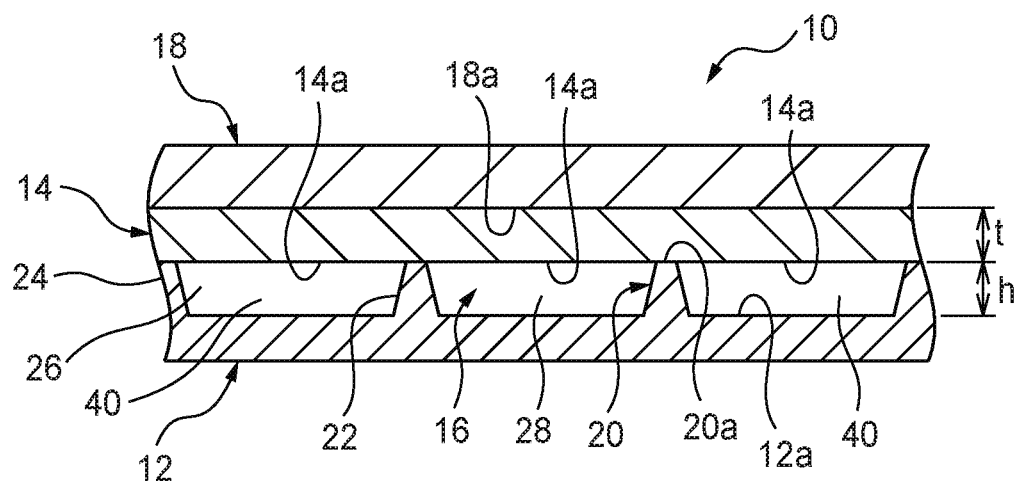
FIG. 1C is a cross-sectional view at line I-I of the article in FIG. 1A.
Figure 2A:
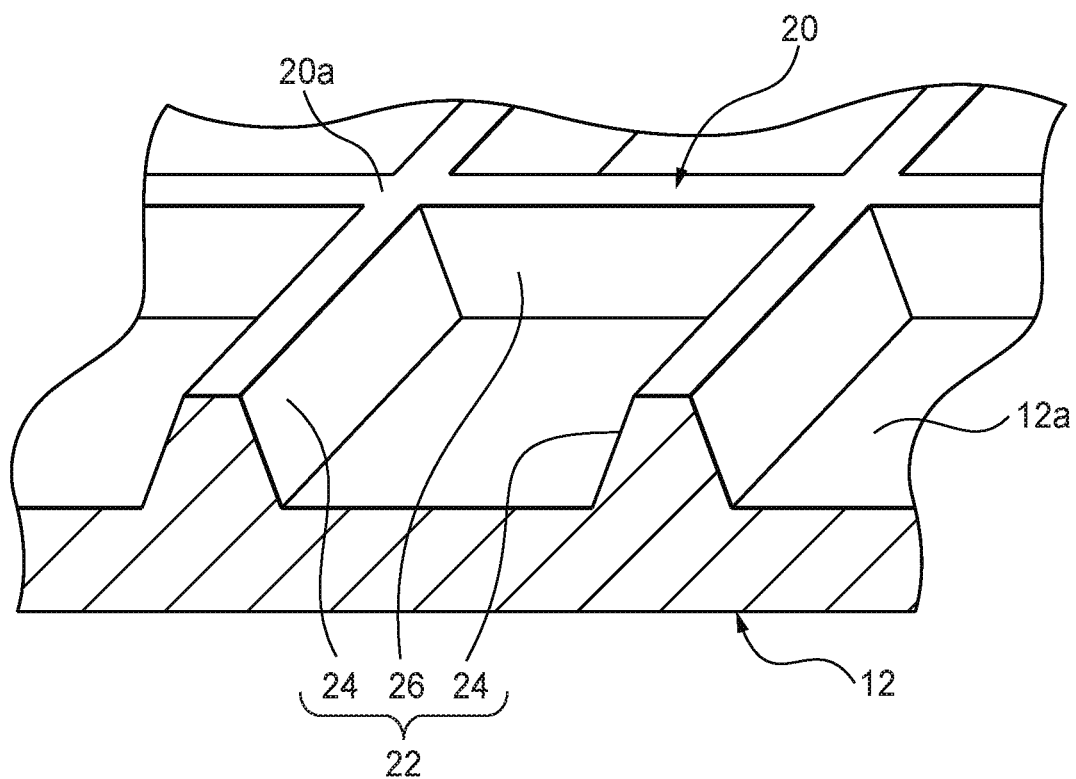
FIG. 2A is an enlarged perspective view of a release layer had by the article in FIG. 1A.
Figure 2B:
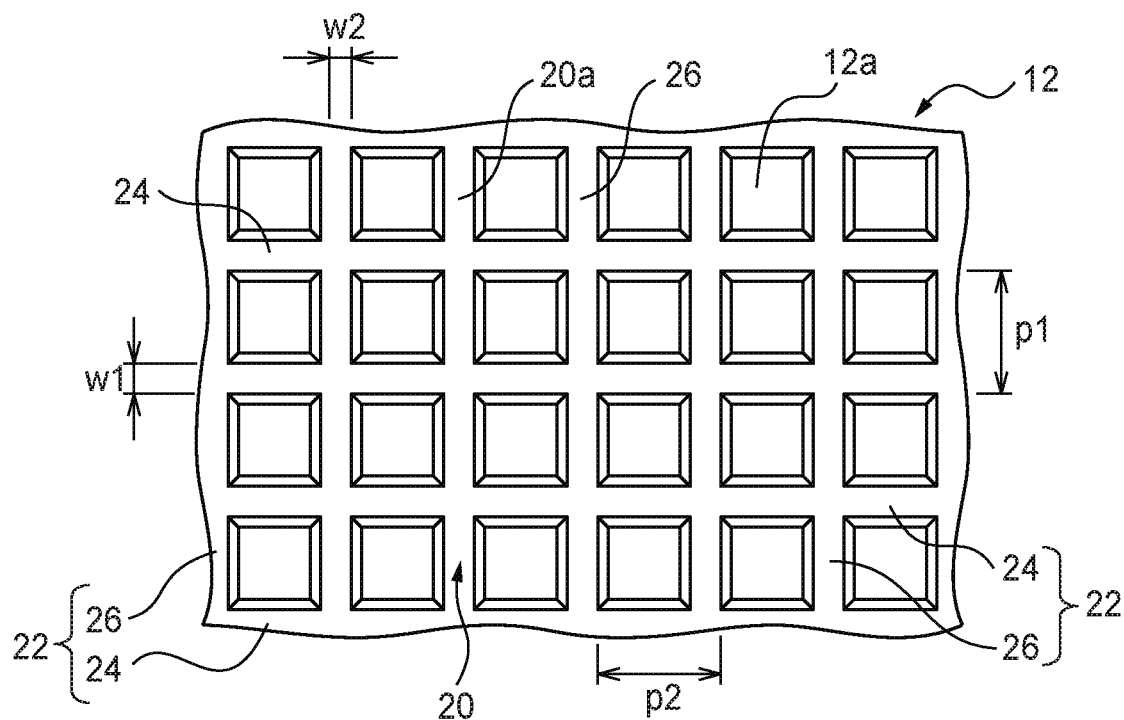
FIG. 2B is a front view of the release layer in FIG. 2A.

An embodiment of the present invention is described in detail below with reference to the attached drawings. In all the drawings, corresponding components are labeled with the same reference signs. FIG. 1A to 1C illustrate an article 10 according to one embodiment. FIGS. 2A and 2B illustrate a release layer 12 had by the article 10.

As illustrated in FIG. 1A to 1C, the article 10 is provided with an adhesive layer 14 that includes an adhesive, a release layer 12 that is releasably stacked on the adhesive layer 14, and an air layer 16 that is interposed between the adhesive layer 14 and the release layer 12. A composition of the adhesive used in the adhesive layer 14 is not limited in particular, but for example, a known pressure-sensitive adhesive such as a silicone adhesive, an acrylic adhesive, or a rubber adhesive can be used. The adhesive may include a tackifier as necessary in adjusting an adhesive force. Moreover, various additives such as a filler and an ultraviolet absorber may be included as necessary.

The article 10 is further provided with a substrate layer 18 that is stacked on the adhesive layer 14 on an opposite side relative to the release layer 12. The substrate layer 18 can be formed from a plastic film, a nonwoven fabric, a woven fabric, a stacked body thereof, or the like. The adhesive layer 14 is provided along one surface 18A of the substrate layer 18 as a layer of the adhesive having a substantially uniform thickness t (FIG. 1C). The substrate layer 18 supports the adhesive layer 14 that has adhesion so the substantially uniform thickness t is maintained. While not illustrated, in order to increase an anchoring effect (bonding strength) between the adhesive layer 14 and the substrate layer 18, as necessary, a primer layer may be further provided between the adhesive layer 14 and the substrate layer 18.

The release layer 12 has a surface 12a that opposes the adhesive layer 14, and on the surface 12a, microprotrusions 20 contact the adhesive layer 14 with tips 20a. The air layer 16 is formed between the adhesive layer 14 and the surface 12a of the release layer 12 and the microprotrusions 20. The microprotrusions 20 are provided with a wall-shaped portion 22 having a shape that at least partially surrounds the air layer 16 between the adhesive layer 14 and the release layer 12. The wall-shaped portion 22, by at least partially surrounding the air layer 16, protects a main portion 14a of the adhesive layer 14 that is adjacent to the air layer 16 from contamination. In the illustrated embodiment, the wall-shaped portion 22 has a shape that substantially completely surrounds the air layer 16 between the adhesive layer 14 and the release layer 12 and is configured so the air layer 16 is not exposed to an outer side of the article 10.

As illustrated in FIGS. 2A and 2B, the wall-shaped portion 22 of the microprotrusions 20 has pluralities of wall portions 24, 26 that intersect each other. In the illustrated embodiment, the first plurality of wall portions 24 extends linearly along the surface 12a in a substantially parallel manner and separated at substantially equal intervals, and each of the second plurality of wall portions 26 extends linearly along the surface 12a in a substantially parallel manner and separated at substantially equal intervals in a direction substantially orthogonal to the first plurality of wall portions 24. In the illustrated embodiment, the first plurality of wall portions 24 has dimensions and shapes that are substantially identical to each other, the second plurality of wall portions 26 has dimensions and shapes that are substantially identical to each other, and the first wall portion 24 and the second wall portion 26 have dimensions and shapes that are substantially identical to each other in a vertical cross section (FIG. 2A). Moreover, the intervals of adjacent first wall portions 24 are substantially uniform overall, the intervals of adjacent second wall portions 26 are substantially uniform overall, and the intervals of the first wall portions 24 and the intervals of the second wall portions 26 are substantially equal to each other. The microprotrusions 20 provided with such a wall-shaped portion 22 has the tips 20a thereof configured to draw a pattern of a square lattice in the plan view of FIG. 2B. Note that the configuration of the microprotrusions 20 is not limited to the configuration illustrated in FIG. 1A to 2B, and the pluralities of wall portions 24, 26 can also have shapes, dimensions, or intervals that differ from each other. Various modified examples of the microprotrusions 20 are described below.

In the illustrated embodiment, an entirety of the release layer 12, which includes the wall-shaped portion 22 of the microprotrusions 20, is integrally formed; the first plurality of wall portions 24 and the second plurality of wall portions 26 are integrally connected to each other at intersection sites thereof. Such a release layer 12 can be manufactured from a desired material by, for example, thermoforming, an embossing process, a calendering process, extrusion molding, or the like. A treatment such as sandblasting or etching can be performed as necessary on a cast roll used in various molding processes; by such a treatment, microprotrusions 20 of a desired shape can be created. The material of the release layer 12 is not limited in particular, but for example, a thermoplastic resin can be adopted; preferably, an olefin such as polyethylene or polypropylene can be adopted. As the olefin, for example, a 90/10 to 10/90 blend of homopolypropylene and low-density polyethylene can be adopted.

Figure 3:
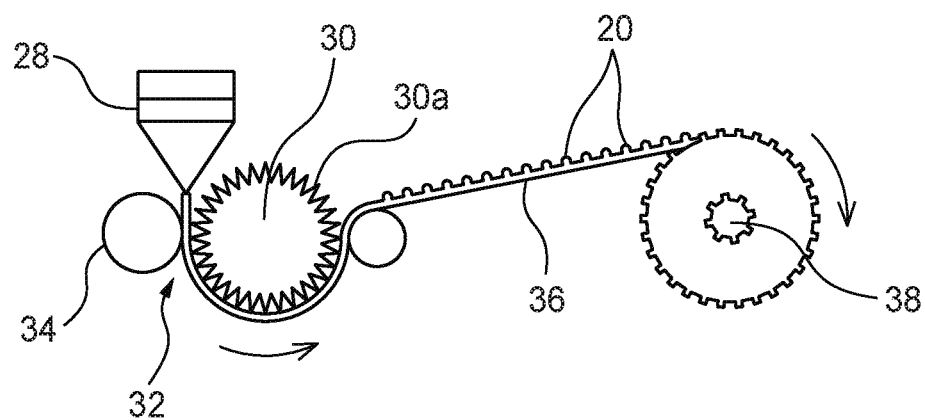
FIG. 3 is a diagram describing an example of a manufacturing process of the release layer in FIG. 2A.

FIG. 3 schematically illustrates an example of a manufacturing process of the release layer 12. In the illustrated example, prepared are a nozzle 28 that extrudes the material of the release layer 12 in a molten state, a cast roll 30 that has female dies 30a of the microprotrusions 20 on an outer peripheral surface, a rubber roll 34 that forms a nip 32 in cooperation with the cast roll 30, and a winder 38 that continuously winds a web-shaped material 36 that passes through the nip 32 and is solidified. The material of the release layer 12 in the molten state is supplied to the nip 32 by being continuously extruded from the nozzle 28 and is molded into a web shape by cooling on the outer peripheral surface of the cast roll 30, which rotates continuously. While cooling, on one surface of the web-shaped material 36, the microprotrusions 20 are consecutively molded by the female dies 30a. By cutting to a desired shape and dimensions the web-shaped material 36 wound by the winder 38, the release layer 12 is obtained.

In the article 10, by the adhesive layer 14 exhibiting an adhesive action on the tips 20a of the microprotrusions 20, a state where the release layer 12 is releasably installed to the adhesive layer 14 is maintained. In this state, as illustrated in FIG. 1C, the air layer 16 is divided into a plurality of air layer portions 40 by the first and second pluralities of wall portions 24, 26. Individual air layer portions 40 are surrounded on four sides by a pair of first wall portions 24 and a pair of second wall portions 26; the main portion 14a of the adhesive layer 14 adjacent to each air layer portion 40 is protected from contamination from powders and liquids.

Supposing for example a configuration of stacking on the adhesive layer 14 a release layer that does not have microprotrusions 20, by affixing a substantially flat surface that spreads over an entirety of the release layer to the adhesive layer 14, a state where the release layer is releasably installed to the adhesive layer 14 is maintained. Compared to a predicted release force of the release layer in this configuration, a release force of the release layer 12 in the article 10 is less by an amount corresponding to an extent a contact area of the release layer 12 on the adhesive layer 14 is reduced to the tips 20a of the microprotrusions 20 that spread over only a portion of the release layer 12. Moreover, by appropriately selecting the contact area of the tips 20a of the microprotrusions 20 on the adhesive layer 14, the release force can be adjusted to a desired range. Because the release force can be adjusted by selecting a shape, dimensions, and the like of the microprotrusions 20, the article 10 can be made to be of a configuration where no release agent is present between the tips 20a of the microprotrusions 20 and the adhesive layer 14.

In this manner, the article 10 according to the embodiment described above can adjust the release force of the release layer 12 to an appropriate desired range according to an application of the article 10 by selecting the shape, the dimensions, and the like of the microprotrusions 20 provided by the release layer 12 (and, therefore, selecting the contact area of the tips 20a of the microprotrusions 20 on the adhesive layer 14). Because the release force of the release layer 12 can be adjusted, for example, a selection width of the material of the release layer 12 that is stacked on the adhesive layer 14 that includes the silicone adhesive can be enlarged. For example, as the release layer 12, because a generic material such as the olefin can be used without using a comparatively expensive material such as a fluorine release agent, which is generally used with a silicone adhesive, the article 10 can be manufactured comparatively inexpensively even in a situation where an adhesive layer 14 is provided that includes the silicone adhesive.

Furthermore, because the article 10 can protect the main portion 14a of the adhesive layer 14 that is adjacent to the air layer 16 from contamination by the wall-shaped portion 22 had by the microprotrusions 20, it can be implemented as, for example, a medical article such as surgical tape. Moreover, by the article 10 having the configuration where no release agent is present between the tips 20a of the microprotrusions 20 and the adhesive layer 14, reduction of the adhesive force (bonding strength) of the adhesive layer 14 due to transference of the release agent (for example, the fluorine release agent or the silicone release agent migrating to the adhesive surface) after the release layer 12 is released can be prevented. Moreover, because a temporal change of the release force due to the release agent migrating to the adhesive layer 14 over time can be prevented if no release agent is present, the article 10 can suppress a temporal change of the release force.

For example, to adjust a release force to a desired range, a silicone release liner that uses silicone as a release agent and a fluorine release liner that uses fluorine as a release agent are known. With silicone release liners, as is known in the industrial fields of semiconductors and other precision electronics (for example, hard disk drives (HDD)), there are situations where, for example, head crushing or contact failure of an HDD or the like arises due to migration of the silicone release agent to an adhesive layer or mixing (that is, two-dimensional migration) of the migrated silicone release agent with electronic components or electronic equipment. Moreover, with fluorine release liners, there are situations where a toxic gas arises when they are incinerated. In contrast thereto, the article 10, by having the configuration where no release agent is present between the tips 20a of the microprotrusions 20 and the adhesive layer 14, can avoid migration of the release agent to the adhesive layer 14; therefore, it can be favorably used in precision electronics and the like as well. Moreover, the article 10, by using the silicone release agent between the tips 20a of the microprotrusions 20 and the adhesive layer 14, can avoid giving rise to a toxic gas when it is incinerated.

In the article 10, the release force (initial release force) of the release layer 12 can be adjusted by appropriately selecting various parameters such as below of the microprotrusions 20.

i) Protrusion height h of microprotrusions 20 from surface 12a (FIG. 1C):

For example, this can be such that $h \geq 50$ μm, $h \geq 0.50 \times t$, $h \leq 120$ μm, or $h \leq 2{,}000$ μm. Preferably, this can be such that $h \geq 0.75 \times t$ or $h \geq t$.

ii) Pitches p1, p2 of adjacent wall portions 24, 26 (FIG. 2B):

For example, these can be such that $p1 \geq 200$ μm, $p1 \geq 400$ μm, $p2 \geq 200$ μm, $p2 \geq 400$ μm, $p1 \leq 4{,}000$ μm, $p1 \leq 1{,}000$ μm, $p2 \leq 4{,}000$ μm, $p2 \leq 1{,}000$ μm, or $p1 = p2$.

iii) Widths w1, w2 of tips 20a of microprotrusions 20 (wall portions 24, 26) (FIG. 2B):

For example, these can be such that $w1 > 0$ μm, $w2 > 0$ μm, $w1 \leq 100$ μm, $w2 \leq 100$ μm, or $w1 = w2$.

iv) Area ratio R of contact surface between microprotrusions 20 and adhesive layer 14 and entire surface of adhesive layer 14:

For example, this can be such that $R > 0\%$ or $R \leq 50\%$ (assuming that both the microprotrusions 20 and the adhesive layer 14 are rigid bodies).

v) Intersection angle θ of both side surfaces 20b of microprotrusions 20 (FIG. 4):

For example, this can be such that $\theta \geq 0°$, $\theta \leq 90°$, or $\theta \leq 60°$.

The release force F of the release layer 12 realized by appropriately selecting several of the above parameters i to v can be such that, in a situation where the adhesive layer 14 and the substrate layer 18 are released from the release layer 12 in a 180-degree direction, for example, $F \geq 10$ N/25 mm, $F \geq 0.15$ N/25 mm, $F \geq 0.20$ N/25 mm, $F \leq 2.0$ N/25 mm, $F \leq 1.5$ N/25 mm, or $F \leq 1.0$ N/25 mm.

Figure 4:
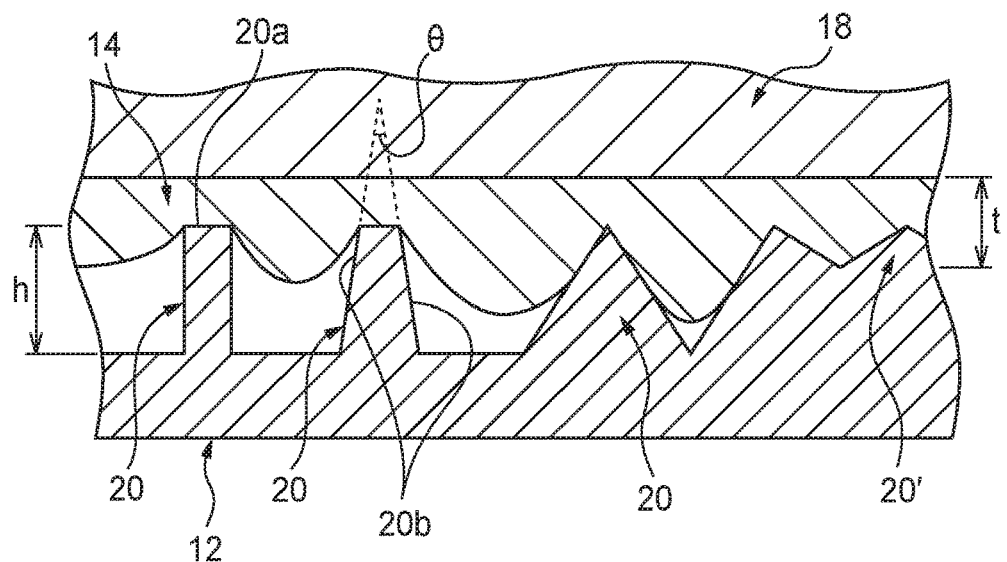
FIG. 4 is a diagram describing a function of the release layer in FIG. 2A.

FIG. 4 is a diagram describing a function of the release layer 12 and schematically illustrates in a cross-sectional view mechanisms by which the parameters i to v affect the release force F. In the diagram, the microprotrusion 20 on the left end is such that θ=0°, and it contacts the adhesive layer 14, which has adhesion, substantially only with the tip 20a. The microprotrusion 20 second from the left in the diagram is such that 0°≤θ≤60°, and it contacts the adhesive layer 14, which has adhesion, substantially only with the tip 20a, but depending on the adhesion, a portion of the side surface 20b adjacent to the tip 20a also contacts the adhesive layer 14. As illustrated in the microprotrusion 20 third from the left in the diagram, as θ approaches 90°, the contact area between the side surface 20b and the adhesive layer 14 increases. A microprotrusion 20' on the right end in the diagram is such that θ>90°, and substantially an entire side surface contacts the adhesive layer 14. As the area ratio R of the contact surface between the microprotrusion 20 and the adhesive layer 14 increases, the release force F increases. Note that even with microprotrusions 20 with the same dimensions and shapes, the area ratio R changes according to the adhesion of the adhesive layer 14 and a flexibility of the substrate layer 18, thereby changing the release force F.

The microprotrusions 20 can have various configurations other than the above configuration. FIG. 5A to 5I are diagrams substantially corresponding to FIG. 2B and schematically illustrate a pattern drawn by the tips 20a of microprotrusions 20 of various configurations. The configurations of the microprotrusions 20 of each diagram are as follows.

Figure 5A:
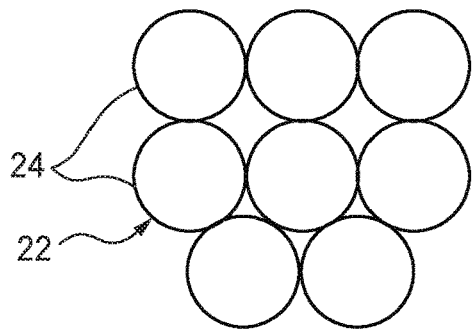
FIG. 5A is a schematic plan view schematically illustrating a modified example of the release layer.

FIG. 5A: A wall-shaped portion 22 is provided that combines a plurality of annular wall portions 24.

Figure 5B:
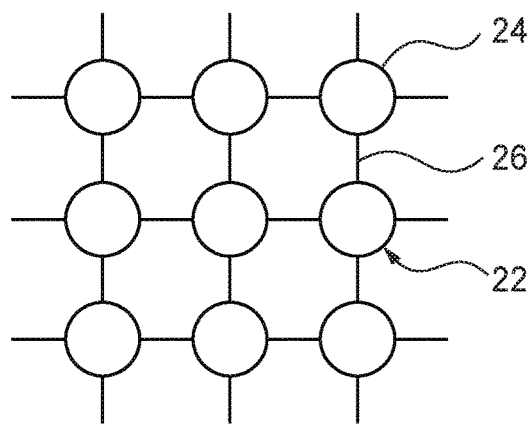
FIG. 5B is a schematic plan view schematically illustrating a modified example of the release layer.

FIG. 5B: A wall-shaped portion 22 is provided that connects a plurality of annular wall portions 24 by a plurality of linear wall portions 26.

Figure 5C:
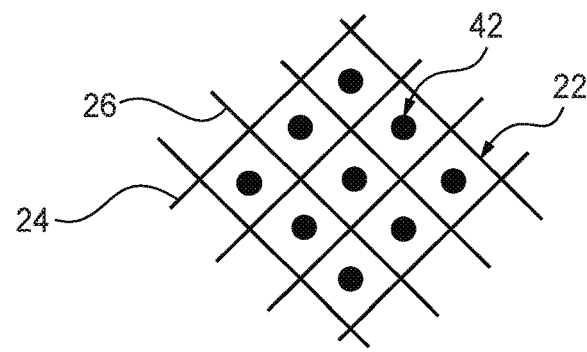
FIG. 5C is a schematic plan view schematically illustrating a modified example of the release layer.

FIG. 5C: A wall-shaped portion 22 that has pluralities of linear wall portions 24, 26 that intersect each other and columnar portions 42 that are disposed separated from the wall-shaped portion 22 in the rectangular or rhomboid space surrounded by the wall portions 24, 26 are provided. The columnar portions 42 contact the main portion 14a (FIG. 1C) of the adhesive layer 14 by tips thereof.

Figure 5D:
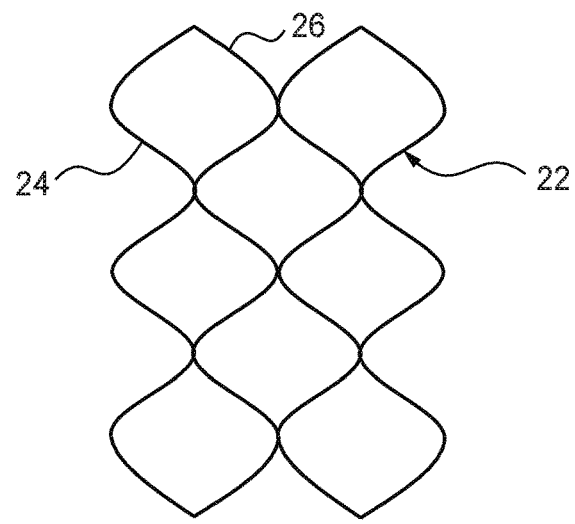
FIG. 5D is a schematic plan view schematically illustrating a modified example of the release layer.

FIG. 5D: A wall-shaped portion 22 is provided that combines pluralities of wave-shaped wall portions 24, 26.

Figure 5E:
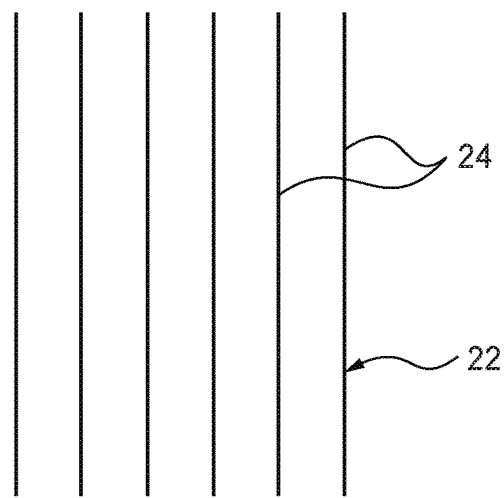
FIG. 5E is a schematic plan view schematically illustrating a modified example of the release layer.

FIG. 5E: A wall-shaped portion 22 is provided that disposes a plurality of linear wall portions 24 so they are parallel to each other and separated at predetermined intervals. In this situation, the wall-shaped portion 22 partially surrounds the air layer 16 (FIG. 1C) between the adhesive layer 14 and the release layer 12. Depending on an application of the article 10, even with such a wall-shaped portion 22, the main portion 14a (FIG. 1C) of the adhesive layer 14 adjacent to the air layer 16 can be protected from contamination.

Figure 5F:
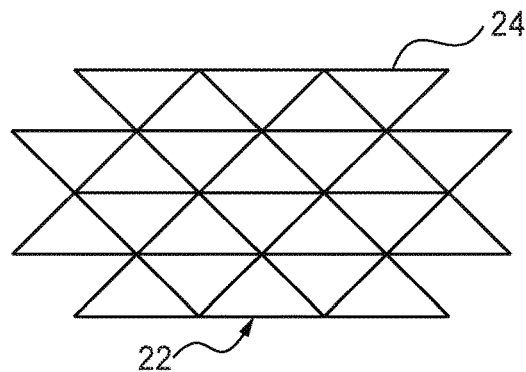
FIG. 5F is a schematic plan view schematically illustrating a modified example of the release layer.
Figure 5G:
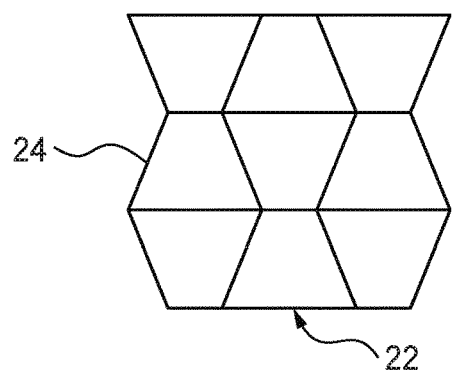
FIG. 5G is a schematic plan view schematically illustrating a modified example of the release layer.
Figure 5H:
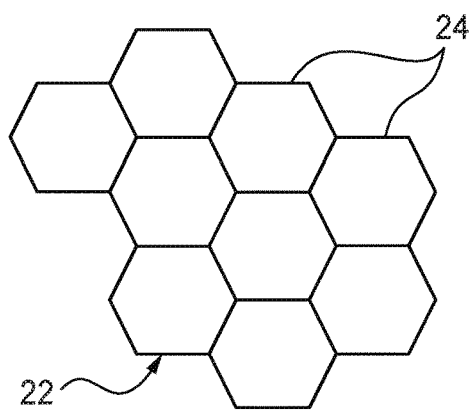
FIG. 5H is a schematic plan view schematically illustrating a modified example of the release layer.

FIG. 5F: A wall-shaped portion 22 is provided that combines a plurality of triangular wall portions 24.

FIG. 5F: A wall-shaped portion 22 is provided that combines a plurality of trapezoidal wall portions 24.

FIG. 5F: A wall-shaped portion 22 is provided that combines a plurality of hexagonal wall portions 24.

Figure 5I:
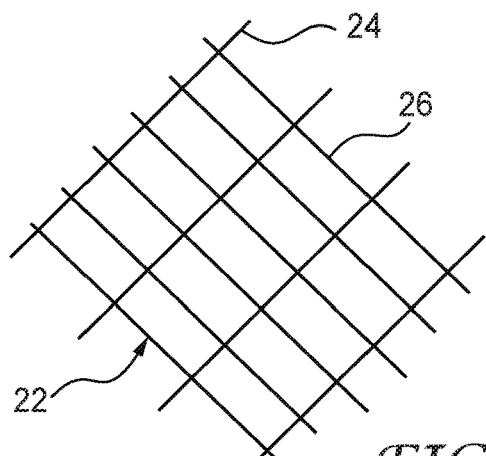
FIG. 5I is a schematic plan view schematically illustrating a modified example of the release layer.

FIG. 5I: A wall-shaped portion 22 is provided that disposes each plurality of linear wall portions 24, 26 which intersect each other at different intervals. The microprotrusions 20 provided with such a wall-shaped portion 22 have a shape such that the release force of the release layer 12 varies according to the release direction of the release layer 12 along the adhesive layer 14. In the illustrated example, a release force of when releasing the release layer 12 in a direction where the wall portions 24 with wide intervals is sequentially released (that is, a direction substantially parallel to the wall portions 26) is less than a release force of when releasing the release layer 12 in a direction where the wall portions 26 with narrow intervals is sequentially released (that is, a direction substantially parallel to the wall portions 24).

Figure 6A:
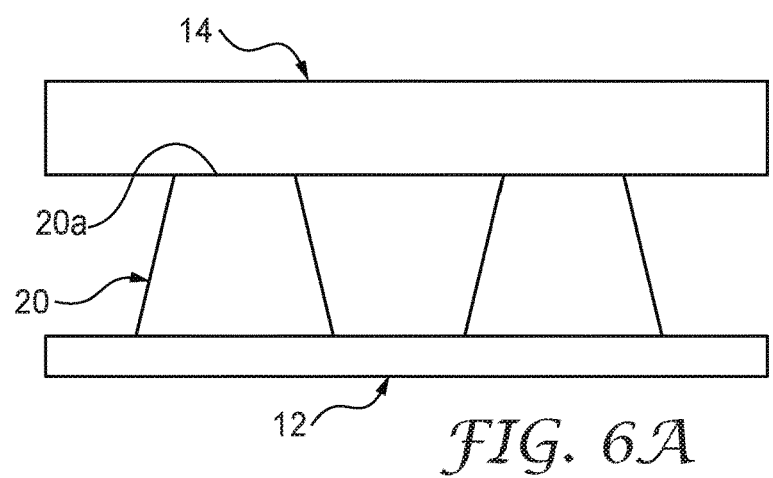
FIG. 6A is a schematic plan view schematically illustrating a modified example of the release layer.
Figure 6B:
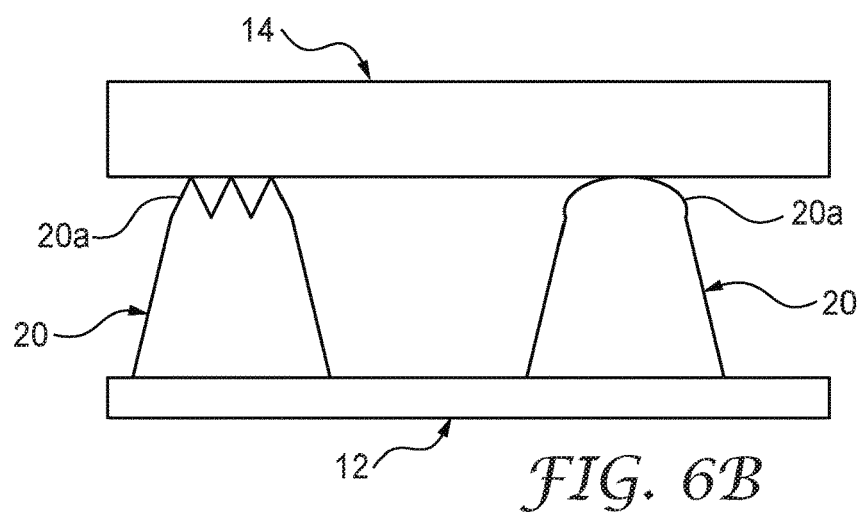
FIG. 6B is a schematic plan view schematically illustrating a modified example of the release layer.

FIGS. 6A and 6B schematically illustrate various surface shapes that the tips 20a of the microprotrusions 20 can have. With the microprotrusions 20 illustrated in FIG. 6A, the surface shape of the tips 20a is planar. With the microprotrusions 20 illustrated in FIG. 6B, the tips 20a have surface shapes other than a plane. For example, with the microprotrusion 20 on the left side in FIG. 6B, the tip 20a is a rough surface having a plurality of concavities and convexities, and with the microprotrusion 20 on the right side in FIG. 6B, the tip 20a is a curved surface that is an arc or an arcuate. With a configuration where the tips 20a of the microprotrusions 20 have a surface shape other than a plane, the harder the adhesive layer 14, the more the area ratio R (and therefore the release force) can be reduced.

EXAMPLES

The various effects described above that the article 10 exhibits in relation to the release force F are evaluated by experiments 1 to 5 below.

Experiment 1

The release layer 12 illustrated in FIGS. 2A and 2B is manufactured with the parameters i, ii, and iv of the microprotrusions 20 changed, and samples 1 to 5 are prepared. Each sample 1 to 5 is manufactured by, after manufacturing an olefin sheet of a 200-μm thickness with a 90/10 blend of homopolypropylene and low-density polyethylene as a material, pressing the olefin sheet while heated onto a metal template having female dies of the microprotrusions 20. Meanwhile, a flat olefin sheet of a 200-μm thickness manufactured from the 90/10 blend of homopolypropylene and low-density polyethylene is made to be a release layer 12' according to comparative example 1.

The parameters i, ii, and iv of each sample are made to be as follows.

Sample 1: h=100 μm, p1=p2=500 μm, R=6.9%
Sample 2: h=100 μm, p1=p2=800 μm, R=4.3%
Sample 3: h=100 μm, p1=p2=1,000 μm, R=3.5%
Sample 4: h=75 μm, p1=p2=800 μm, R=4.3%
Sample 5: h=125 μm, p1=p2=800 μm, R=3.5%

The other parameters iii and v are made to be the same, such that w1=w2=35 μm and θ=40°.

As a silicone adhesive tape having the adhesive layer 14 and the substrate layer 18 ("tape 1" hereinbelow), one is prepared that stacks, on a polyester-elastomer-film side of a substrate layer 18 made by heating and stacking a 25-μm (1 mil) polyester elastomer film on a nonwoven fabric, an adhesive described in JP 2012-507608A (example 24) such that an adhesive layer 14 of a 100 μm thickness is made after curing. A width of the tape 1 is 25 mm, and the thickness of the adhesive layer 14 is 100 μm.

The release layers 12 of samples 1 to 5 and the release layer 12' of comparative example 1 are each stacked on the adhesive layer 14 of the tape 1 described above and a roller of a weight of 2 kg is rolled forward and back, once each, over the substrate layer 18 of the tape 1 to obtain articles 10 according to the various examples and an article 10' according to the comparative example. After exposing these articles 10, 10' to conditions 1≤being left in a room-temperature (23° C.) environment for 20 minutes—and conditions 2—being left in a 60° C.-environment for 7 days—a release test where the tape 1 of the individual articles 10, 10' is released from the release layers 12, 12' in a 180° direction at a speed of 300 mm/minute is performed, and the release force F (N/25 mm) is measured. Measurement results (average value of three tests) are indicated in table 1.

TABLE 1

| | Release force (N/25 mm) Tape 1 | |
|---|---|---|
| Release layer | Conditions 1 | Conditions 2 |
| Sample 1 | 0.99 | 0.91 |
| Sample 2 | 0.70 | 0.78 |
| Sample 3 | 0.71 | 0.46 |
| Sample 4 | 0.94 | 0.80 |
| Sample 5 | 0.60 | 0.60 |
| Comparative ex. 1 | 1.86 | 2.63 |

As indicated in table 1, it was verified that while the release force F of the article 10' having the release layer 12' of comparative example 1 increases when heated and over time (conditions 2) from an initial state (conditions 1), the release force F of the articles 10 having the release layers 12 of the samples 1 to 5 hardly changes even when heated and over time.

Experiment 2

As the silicone adhesive tape having the adhesive layer 14 and the substrate layer 18, tapes 2 and 3 below are prepared.

Tape 2: A coating syrup is obtained by melting 60 parts of MQ resin (MQ803TF (product name)) (obtainable from Wacker Chemie AG (Munich)) as an adhesive with 100 parts of silonol-terminated polydimethylsiloxane fluid (Wacker Elastomer 350N (product name)) (obtainable from Wacker Chemie AG (Munich)). This coating syrup is coated by a knife coater at a thickness of 0.050 mm on a substrate 18 made from the same nonwoven fabric as the substrate 18 of the tape 1 of experiment 1 and immediately afterward exposed to electron beam irradiation of 60 KGy/180 KeV to be cured, thereby forming the adhesive layer 14.

Tape 3: Other than making the coating thickness of the coating syrup 0.025 mm, the tape 3 is manufactured under the same conditions as the tape 2.

The release layers 12 of the samples 1 to 5 and the release layer 12' of comparative example 1 are each stacked on the adhesive layer 14 of the tapes 2 and 3 described above and a roller of a weight of 2 kg is rolled forward and back, once each, over the substrate layer 18 of the tapes 2 and 3 to obtain articles 10 according to the various examples and an article 10' according to the comparative example. With regard to these articles 10, 10', the release test is performed under the same conditions (conditions 1, conditions 2) as experiment 1 to measure the release force F (N/25 mm). Measurement results (average value of three tests) are indicated in table 2.

TABLE 2

| | Release force (N/25 mm) | | | |
|---|---|---|---|---|
| | Tape 2 | | Tape 3 | |
| Release layer | Cond. 1 | Cond. 2 | Cond. 1 | Cond. 2 |
| Sample 1 | 0.58 | 0.54 | 0.42 | 0.35 |
| Sample 2 | 0.24 | 0.36 | 0.23 | 0.23 |
| Sample 3 | 0.23 | 0.33 | 0.17 | 0.20 |
| Sample 4 | 0.29 | 0.37 | 0.18 | 0.30 |
| Sample 5 | 0.27 | 0.31 | 0.15 | 0.27 |
| Comparative ex. 1 | 1.53 | 2.78 | 0.98 | 2.36 |

As indicated in table 2, with the tapes 2 and 3 as well, it was verified that while the release force F of the article 10' having the release layer 12' of comparative example 1 increases when heated and over time (conditions 2) from an initial state (conditions 1), the release force F of the articles 10 having the release layers 12 of the samples 1 to 5 hardly changes even when heated and over time.

Experiment 3

The release layer 12 illustrated in FIGS. 2A and 2B is manufactured by the method described with reference to FIG. 3 and under the same parameters i to v as sample 2 to prepare sample 6. A basis weight is 800 g/m$^2$. Meanwhile, as comparative example 2, a release layer 12' whose surface is coated with a fluorosilicone release agent (Fujiko K1 (product name)) (obtainable from Fujico Co., Ltd. (Marugame-shi)) is prepared, and as comparative example 3, a release layer 12' whose surface is coated with a fluorocarbon release agent (Scotchpak (trade name) 9741 (product name)) (obtainable from 3M Japan Limited (Tokyo)) is prepared.

As the silicone adhesive tape having the adhesive layer 14 and the substrate layer 18, the tape 1 used in experiment 1 is prepared. The release layer 12 of sample 6 and the release layers 12' of comparative examples 2 and 3 are each stacked on the adhesive layer 14 of the tape 1 and a roller of a weight of 2 kg is rolled forward and back, once each, over the substrate layer 18 of the tape 1 to obtain an article 10 according to the example and articles 10' according to the comparative examples. With regard to these articles 10, 10', the release test is performed under the same conditions (conditions 1, conditions 2) as experiment 1 to measure the release force F (N/25 mm). Measurement results (average value of three tests) are indicated in table 3.

TABLE 3

| | Release force (N/25 mm) Tape 1 | |
|---|---|---|
| Release layer | Conditions 1 | Conditions 2 |
| Sample 6 | 0.70 | 0.68 |
| Comparative ex. 2 | 0.38 | 0.65 |
| Comparative ex. 3 | 0.40 | 0.85 |

As indicated in table 3, it was verified that while the release forces F of the articles 10' having the release layers 12' of comparative examples 2 and 3 both increase when heated and over time (conditions 2) from an initial state (conditions 1), the release force F of the article 10 having the release layer 12 of sample 6 hardly changes even when heated and over time. In comparative examples 2 and 3, it is thought that the release agent migrates to the adhesive layer 14 when heated and over time.

Experiment 4

As the silicone adhesive tape having the adhesive layer 14 and the substrate layer 18, a tape 4 below is prepared.

Tape 4: A coating syrup is obtained by melting 30 parts of MQ resin (MQ803TF (product name)) (obtainable from Wacker Chemie AG (Munich)) as an adhesive with 100 parts of trimethylsilyl-terminated polydimethylsiloxane fluid (Wacker shilicone fluid AK 1,000,000 (product name)) (obtainable from Wacker Chemie AG (Munich)). This coating syrup is coated by a knife coater at a thickness of 0.050 mm on the substrate 18 made from a silicone-treated PET film and immediately afterward exposed to electron beam irradiation of 40 KGy/180 KeV to be cured, thereby forming the adhesive layer 14.

The release layer 12 of sample 6 and the release layers 12' of comparative examples 2 and 3 are each stacked on the adhesive layer 14 of the tape 4 described above and a roller of a weight of 2 kg is rolled forward and back, once each, over the substrate layer 18 of the tape 4 to obtain an article 10 according to the example and articles 10' according to the comparative examples. After exposing these articles 10, 10' to conditions 3—being left in a room-temperature (23° C.) environment for 7 days—and conditions 2—being left in a 60° C.-environment for 7 days—a release test where the tape 4 of the individual articles 10, 10' is released from the release layers 12, 12' in a 180° direction at a speed of 300 mm/minute is performed, and the release force F (N/25 mm) is measured. Measurement results (average value of three tests) are indicated in table 4.

TABLE 4

| Release layer | Release force (N/25 mm) Tape 4 | |
|---|---|---|
| | Conditions 3 | Conditions 2 |
| Sample 6 | 0.14 | 0.08 |
| Comparative ex. 2 | 0.43 | 0.54 |
| Comparative ex. 3 | 0.39 | 0.54 |

As indicated in table 4, it was verified that while the release forces F of the articles 10' having the release layers 12' of comparative examples 2 and 3 both increase more in a high-temperature environment (conditions 2) than a room-temperature environment (conditions 3), the release force F of the article 10 having the release layer 12 of sample 6 hardly changes even in the high-temperature environment. In comparative examples 2 and 3, it is thought that the release agent migrates to the adhesive layer 14 in the high-temperature environment.

Experiment 5

The release layers 12, 12' are released from the articles 10, 10' after being exposed to the conditions 3 and the conditions 2 in experiment 4; each adhesive layer 14 of the tape 4 is stacked on a stainless-steel plate; and a roller of a weight of 2 kg is rolled forward and back, once each, over the substrate layer 18 to affix the individual tapes 4 to the stainless-steel plate. A release test of releasing these tapes 4 from the stainless-steel plate in a 180° direction at a speed of 300 mm/minute is performed, and a force required to release the tape 4 from the stainless-steel plate (that is, a bonding strength) (N/25 mm) is measured. Measurement results (average value of three tests) are indicated in table 5.

TABLE 5

| Release layer | Release force (N/25 mm) Tape 4 | |
|---|---|---|
| | Conditions 3 | Conditions 2 |
| Sample 6 | 2.77 | 2.65 |
| Comparative ex. 2 | 2.39 | 2.04 |
| Comparative ex. 3 | 2.34 | 2.25 |

As illustrated in table 5, it was verified that while the bonding strengths of the tapes 4 after the release layers 12' of comparative examples 2 and 3 are released both decrease more in the high-temperature environment (conditions 2) than the room-temperature environment (conditions 3), the bonding strength of the tape 4 after the release layer 12 of sample 6 is released hardly changes even in the high-temperature environment. In comparative examples 2 and 3, it is thought that a portion of the release agent of the release layer 12' migrates to the adhesive layer 14 in the high-temperature environment.

REFERENCE SIGNS LIST

10 Article
12 Release layer
14 Adhesive layer
16 Air layer
18 Substrate layer
20 Microprotrusion
20a Tip
22 Wall-shaped portion
24, 26 Wall portion
40 Air layer portion
42 Columnar portion

What is claimed is:

1. An article, comprising:
    an adhesive layer comprising a pressure-sensitive adhesive having a thickness of at least 100 μm;
    a release layer comprising microprotrusions on a surface, the microprotrusions each having a height equal to or greater than the thickness of the adhesive layer, the microprotrusions comprising:
        tips having a contact area in contact the adhesive layer, and
        a wall-shaped portion,
        wherein the height of each microprotrusion is measured from the surface to the tips,
    wherein the release layer is releasably installed on the adhesive layer,
    wherein the contact area has a value selected to adjust a release force between the release layer and the adhesive layer, and
    wherein the wall-shaped portion has a plurality of wall portions that intersect each other;
    an air layer interposed between the adhesive layer and the release layer,
        wherein the microprotrusion wall-shaped portion completely surrounds the air layer, and
        wherein the microprotrusion wall-shaped portion protects the adhesive layer adjacent the air layer from contamination; and
    a substrate layer installed on the adhesive layer such that the adhesive layer is between the substrate layer and the release layer.

2. The article according to claim 1, wherein the air layer has a plurality of air layer portions that are divided by the plurality of wall portions.

3. The article according to claim 1, wherein the release layer is provided with columnar portions that contact the main portion of the adhesive layer and are separated from the wall-shaped portion.

4. The article according to claim 1, wherein the microprotrusions have a shape such that a release force of the release layer differs according to a release direction of the release layer along the adhesive layer.

5. The article according to claim 1, wherein an area ratio of a contact surface between the microprotrusions and the adhesive layer and an entire surface of the adhesive layer is greater than 0% and 50% or less.

6. The article according to claim 1, wherein no release agent is present between the microprotrusions and the adhesive layer.

7. The article according to claim 1, wherein the article is a medical article.

* * * * *